United States Patent [19]

Riondel et al.

[11] Patent Number: 5,420,358
[45] Date of Patent: May 30, 1995

[54] PROCESS FOR THE PREPARATION OF DICYCLOPENTENYLOXYETHANOL

[75] Inventors: Alain Riondel, Forbach; Clement Becker, Petite-Roselle, both of France

[73] Assignee: Elf Atochem S.A., Paris-LaDefense, France

[21] Appl. No.: 185,073

[22] Filed: Jan. 18, 1994

[30] Foreign Application Priority Data

Jan. 18, 1993 [FR] France ................. 9300395

[51] Int. Cl.⁶ .................... C07D 41/06; C07C 43/188
[52] U.S. Cl. .................... 568/665; 422/211
[58] Field of Search .......................... 568/665

[56] References Cited

U.S. PATENT DOCUMENTS

| | | | |
|---|---|---|---|
| 4,140,724 | 2/1979 | Nyi et al. | 568/665 |
| 4,365,096 | 12/1982 | Nieh | 568/665 |
| 4,450,307 | 5/1984 | Moss et al. | 568/665 |
| 4,535,148 | 8/1985 | Gladfelter et al. | 568/665 |
| 4,683,083 | 7/1987 | Brunke et al. | 568/665 |

FOREIGN PATENT DOCUMENTS

| | | | |
|---|---|---|---|
| 211549 | 7/1984 | German Dem. Rep. | 568/665 |
| 2642519 | 3/1978 | Germany | 568/665 |
| 1467047 | 3/1989 | U.S.S.R. | 568/665 |

*Primary Examiner*—Joseph E. Evans
*Attorney, Agent, or Firm*—Millen, White, Zelano & Branigan

[57] ABSTRACT

The process for the preparation of dicyclopentenyloxyethanol having the formula

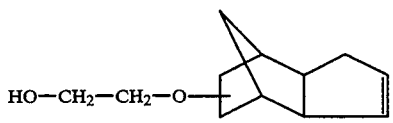

by reaction of dicyclopentadiene with ethyleneglycol in the presence of a catalyst consisting of an acid cation exchange resin, characterized in that it consists in mixing the dicyclopentadiene and the ethyleneglycol in a mixing tank to obtain a mixture, and bringing the mixture in contact with the catalyst in a cartridge separate from the mixing tank.

8 Claims, 3 Drawing Sheets

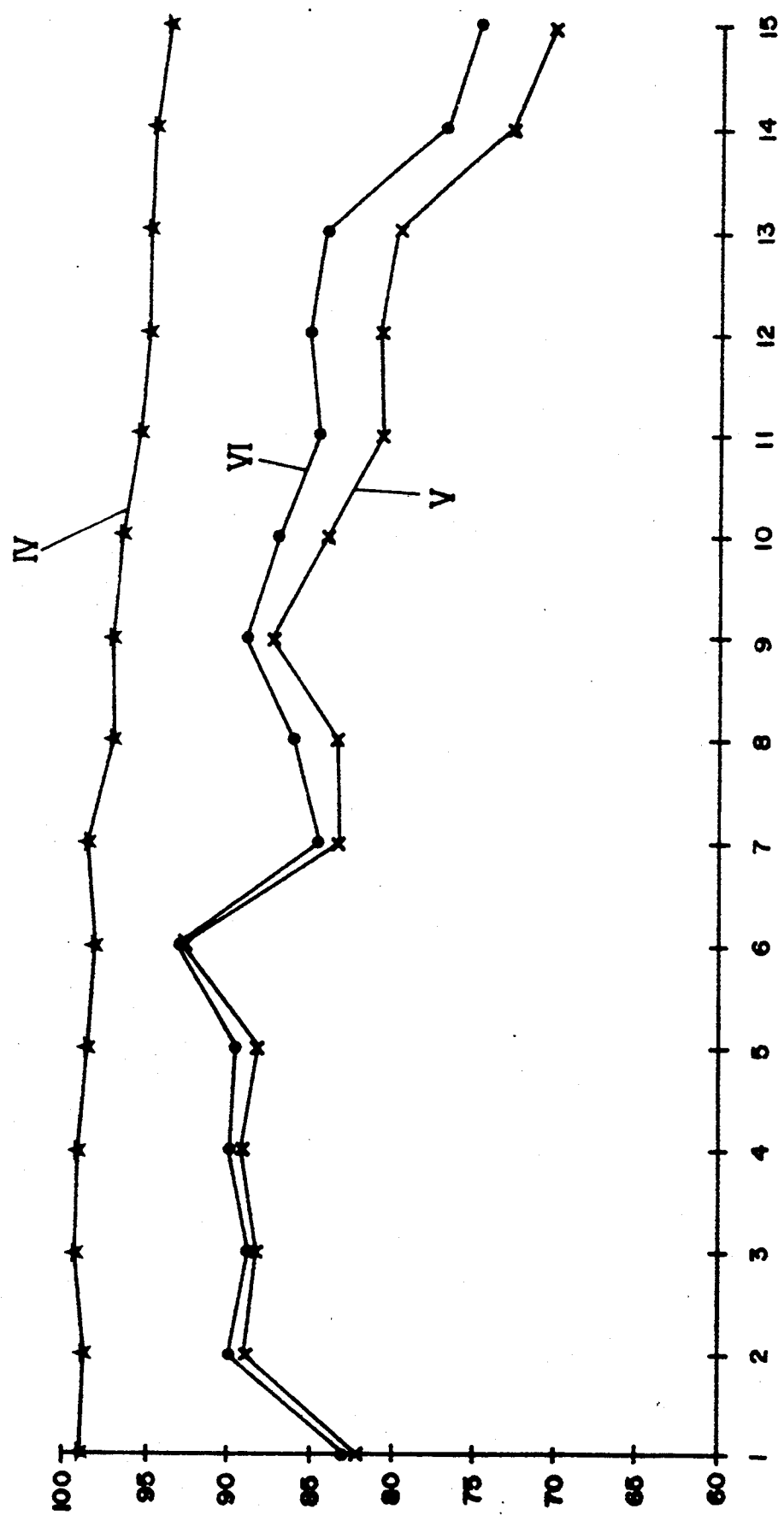
FIG_3

PROCESS FOR THE PREPARATION OF DICYCLOPENTENYLOXYETHANOL

The invention concerns the preparation of dicyclopentenyloxyethanol.

In FR-A-2.399.994 a process is described for the preparation of an addition product of the monoetheroxide type, by reaction between a polyol and dicyclopentadiene. The acid catalyst used is a reticular cation exchange resin with acid functions. The process is discontinuous and requires the prior separation of the catalyst by filtration, before the distillation of the crude reaction product.

The present invention mitigates that disadvantage by a process in which that catalyst filtration stage is entirely eliminated and which, moreover, gives appreciably better conversion, yield and selectivity.

The process for preparing dicyctopentenyloxyethanol, whose formula is

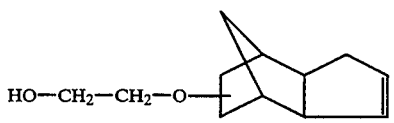

by reaction between dicyctopentadiene and ethyleneglycol in the presence of a catalyst consisting of an acid cation exchange resin, consists in mixing the cyclopentadiene and the ethyleneglycol together in a mixing tank to obtain a mixture, and then bringing the mixture in contact with the catalyst in a cartridge distinct from the mixing tank.

The equipment in which the process is carried out comprises a mixing tank and a cartridge of catalyst positioned outside the tank and communicating with it by a closed circuit, and means of circulating around that circuit the liquid reactants, namely dicyclopentadiene and ethyleneglycol, and the liquid dicyclopentenyloxyethanol produced.

The reactants pass over the solid catalyst without washing it along with them, and return to the mixing tank along with the product. This closed circuit is repeated several times until the reaction is brought to an end and the product obtained is drained out of the equipment. The draining can be carried out without washing away the catalyst in the cartridge, such that there is no need to separate it from the product obtained.

It is best for the means of circulation to be fitted downstream from the tank and upstream from the cartridge, along the direction of circulation in the equipment.

To feed the equipment a source of reactant is provided, which communicates with the circuit via a feed pipe fitted with a stopcock and leading into the circuit at a point downstream from the tank and upstream from the cartridge. To drain the liquid product from the equipment a three-way valve is fitted between the point where the feed pipe discharges into the circuit and the cartridge. When the equipment is in operation, the three-way valve seals off the circuit. To withdraw the product, the valve blocks the circuit and forms an outlet to the outside. It is best for the three-way valve to be fitted upstream from the means of circulation, notably a pump, for example a membrane pump or a geared pump.

It is also preferable to provide a stopcock in the circuit, between the tank and the point where the feed pipe discharges into the circuit.

A source of protective gas can communicate with the tank and the tank can be fitted with a cooling coil. The two branches of the circuit communicating with the tank preferably both meet it at the bottom. The solid acid catalyst can be a Bronstedt acid or a Lewis acid, or best of all, an acid cation exchange resin. The acid functions of the resin may consist of sulfonic acid groups, phosphonic acid groups, phosphinic acid groups or carboxylic acid groups, giving the resin a $pK_a$ value of 6 or less (cf. Friedrich Helfferich, "Ion Exchange", McGraw-Hill, New York, N.Y., 1962, pages 79 to 88). Sulfonic acid resins should preferably have a $pK_a$ value lower than about 1. In general, the resins that can be used in this invention may have a gel-type or macroreticular-type polymer skeleton on which there are the acid functions just mentioned. Among the cation exchange resins that have suitable acid functions, one can mention macroreticular reticulated resins with an aromatic core bearing sulfonic and carboxylic acid groups, for example those described in U.S. Pat. No 3,838.043, and the gel-type macroreticutar resins with phosphonic acid and phosphinic acid groups, whose preparation is described in the work by Freidrich Helfferich, "Ion Exchange", McGraw-Hill (op.cit.), pages 32, 38 and 39. In the case of carboxylic acid resins of low acidity, the acidity can be increased by the presence of an electronegative group such as a cyano or trifiuoromethyt group on the carbon atom, in the a position of the carboxylic acid group. For preference, the resins used in the invention are reticutated cation exchange resins of strong acidity, namely macroreticutar or reticulated gel resins with an aromatic core bearing sulfonic acid groups consisting of a sulfonated polymer, the latter having been formed from a mixture of monomers containing 1 to 100% of its total weight of an aromatic polyvinyl monomer. These resins are characterized by an ion exchange capacity ranging from about 0.5 to 5.0 meq/g. Suitable aromatic polyvinyl monomers are, among others, divinylbenzene, trivinylbenzene, divinyltotuene, divinylnaphthalene, divinylpyridine and diallyl phthatate. The mixture of monomers may also contain up to about 99% of its total weight of an aromatic monovinyl monomer. Suitable aromatic monovinyl monomers are, among others, styrene and its alcoyl and halogenated derivatives, vinylanisole and vinylnaphthalene. However, one can also use as reticulating monomers ethyleneglycol diacrylate and dimethacrylate, trimethylolpropane dimethacrylate and trimethacrylate, allyl acrylate and methacrylate, and diallyl maleate. For preference, the resin will be a macroreticular resin consisting of a sulfonated macroreticular copolymer, this copolymer having been obtained by polymerization of a monomer mixture containing about 10 to 85% of its total weight of an aromatic polyvinyl monomer (preferably divinylbenzene) and 15 to 90% of its total weight of an aromatic monovinyl monomer (preferably styrene) or a gel-type resin consisting of a sulfonated gel copolymer, the copolymer having been obtained by polymerization of a mixture of monomers containing about 1 to 20%, preferably 1 to 10% of its total weight of an aromatic polyvinyl monomer (preferably divinylbenzene), and about 80 to 99%, preferably 90 to 99% of its total weight of an aromatic monovinyl monomer (preferably styrene).

More particularly a strong acid ion exchange resin is preferred, which is not very highly reticulated, a macroporous one having sulfonic acid groups with a total capacity of 1 equivalent/liter, a particle size fraction between 0.315 and 1.25 mm representing at least 90% of its weight and a density between 700 and 800 g/liter.

The proportion of acid resin expressed in equivalents of the resin's acid functional group per mole of dicyclopentadiene or in "equivalent %", which is the number of equivalents of the resin's acid functional groups per mole of dicyctopentadiene x 100%, may vary from 0.01:1 and 0.5:1. The relative proportions between ethyleneglycol and dicyctopentadiene may range between 1:4 and 2:1.

In the attached drawings, presented solely as examples:

FIGS. 2 and 3 are graphs comparing the conversions, yields and selectivities of a classical process and a process conforming to the invention.

Figure 1:
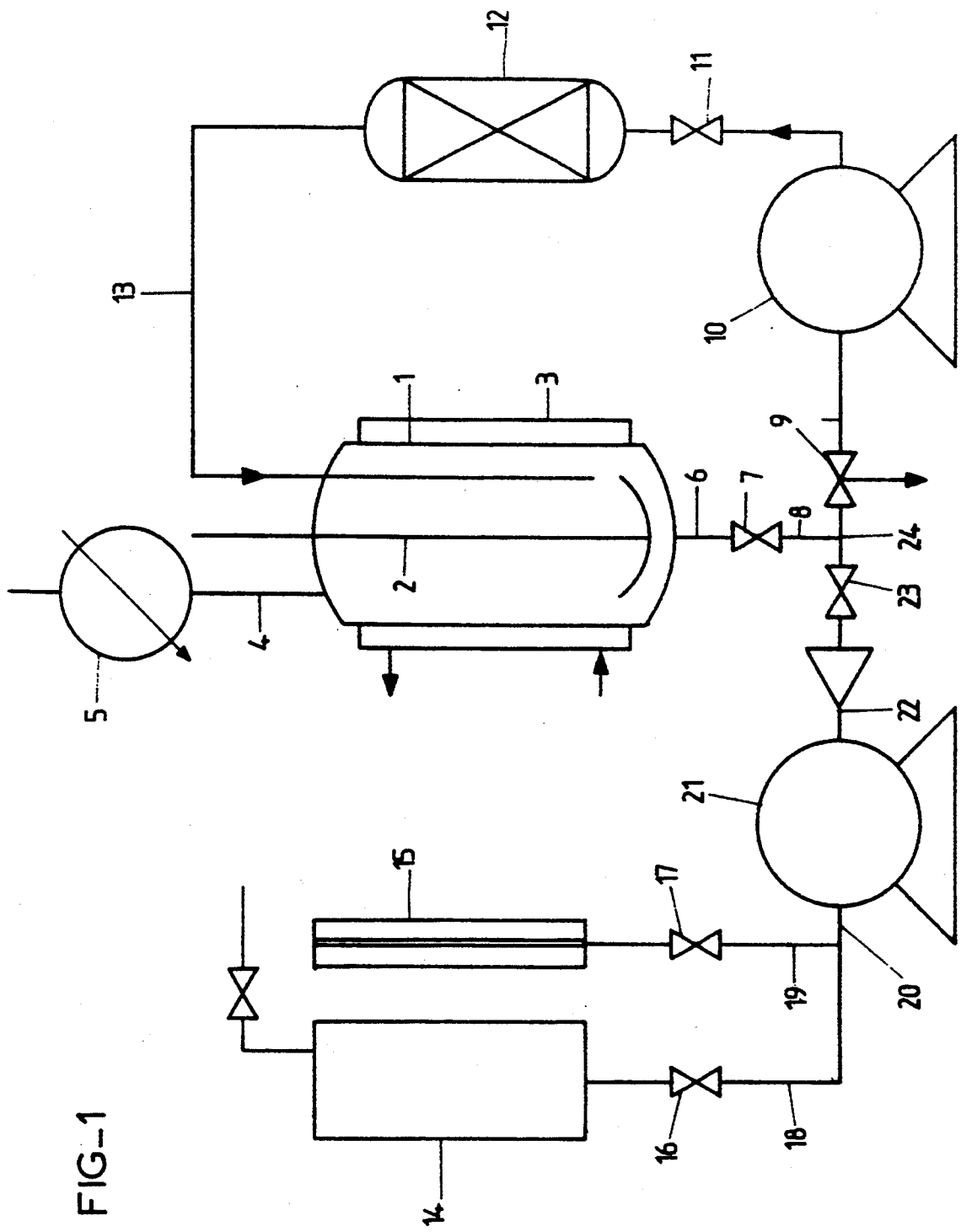
FIG. 1 is a drawing of an installation conforming to the invention.

The installation shown in FIG. 1 comprises a tank 1 fitted with a stirrer 2 and a double envelope 3 for temperature control, and a condenser 4 and 5. From the bottom of tank 1 comes a pipe 6 fitted with a stopcock 7 beyond which the pipe 8 continues to a three-way valve 9. Downstream from the valve 9 is a pump 10 which discharges, via a stopcock 11, into a stainless steel cartridge 12 filled with grains of a resin of the type used in the invention. The cartridge has 2 supports consisting of metal gauzes that retain the resin grains in place. The circuit continues along a pipe 13 leading back to the bottom of the tank 1.

A reservoir 14 of DCPD (dicyclopentadiene) discharges, via a pipe 18 fitted with a stopcock 16, into a pipe 20. Ethyleneglycol is placed directly in the tank t. This pipe leads to the inlet of a metering pump 21 whose delivery pipe 22 leads, via a stopcock 23, to a point 24 in the circuit downstream from the tank 1 and upstream from the cartridge 2, and in fact upstream from the valve 9 and the pump 10. A flowmeter 15 allows the flow of DCPD introduced to be measured.

The equipment works as follows: When the valve 23 is opened, the valve 9 allows passage towards the cartridge 12 and the valve 7 allows the reactants to circulate between the tank i and the cartridge 12 in closed circuit, DCPD is sent from the reservoir 14 via the pump 21, the valve 23, the valve 9 and the pump 10, into the cartridge 12 and then via the pipe 13 back to the tank 1. The valve 23 is then closed once all the DCPD has been added, and this enables a closed circuit to be established for the circulation of the reactants and the product between the cartridge 12 and the mixing tank 1. Once the reaction has been completed, the reaction product is drawn off via the three-way valve 9 which enables the product to be drained out of the equipment.

The following examples illustrate the invention.

COMPARATIVE EXAMPLE

DCPOE (dicyclopentenyloxyethanol) is prepared in batches, as described in FR-A-2.399.994, by reacting 3 moles (396 g) of DCPD with 5.1 moles (316.2 g) of ethyleneglycol in the presence of 6% by weight of a resin with sulfonic acid groups and having a total capacity of 1 equivalent/liter (minimum) according to the DIN standard, a particle size fraction between 0.315 and 1.25 mm (minimum 90%) and a density between 700 and 800 g/liter, relative to the DCPD, namely 23.8 g of the said resin. The reactor is charged with ethyleneglycol and catalyst. the mixture under nitrogen (flow rate 1 liter normal/hour) is heated to 95° C. The DCPD is added over a period of 5 hr with the aid of a metering pump. The exothermic nature of the reaction allows the temperature to increase to the specified value of 105° C. The reaction mixture is stirred continuously for 5 hr after adding all of the DCPD, and then the product is drained off at between 50° and 60° C. and filtered to remove any catalyst.

Figure 2:
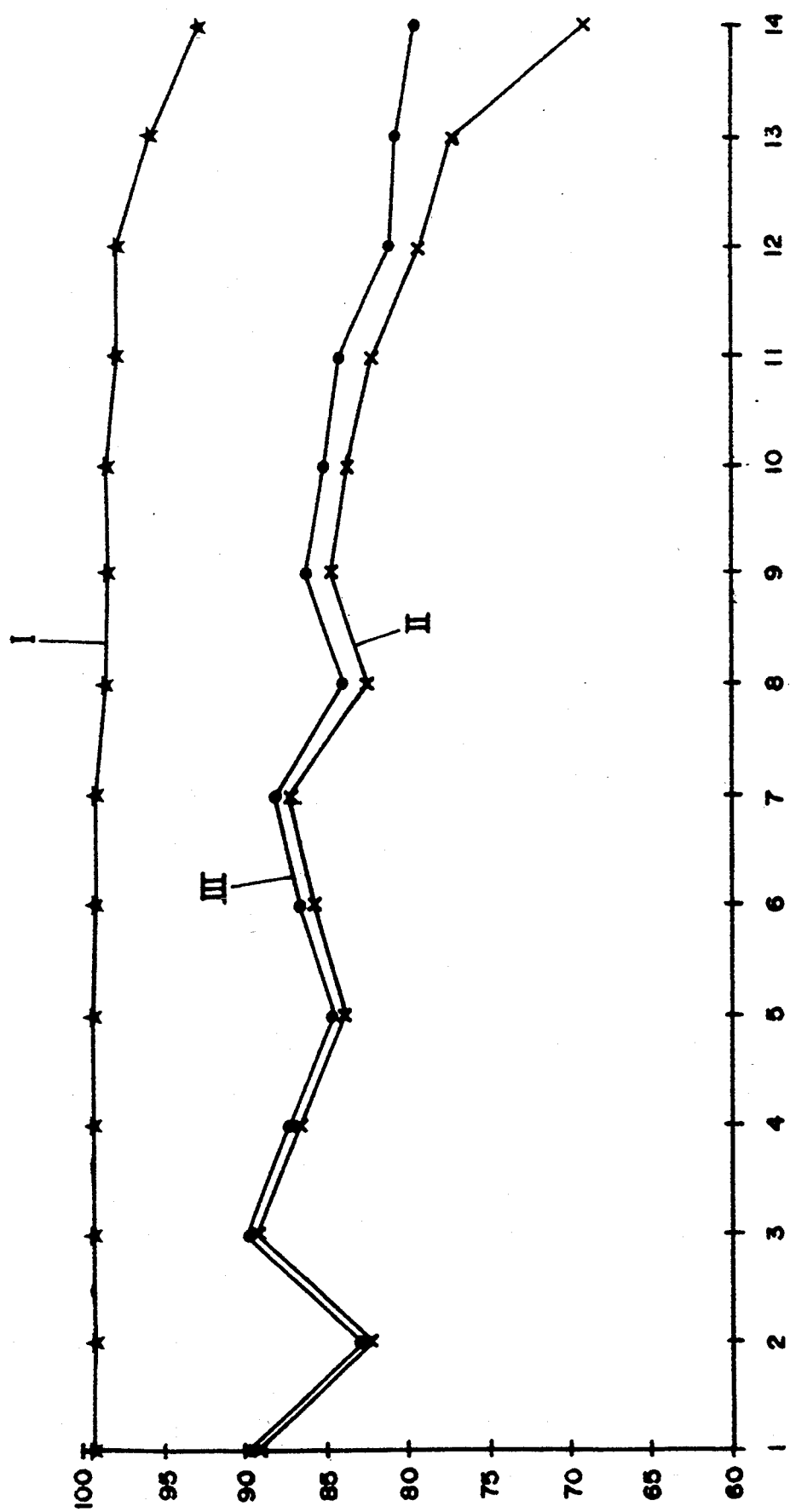

In FIG. 2, curves I, II and III show respectively, as a function of the number of tests, the conversion of the DCPD, namely C (%)=100−[weight of the residual DCPD/weight of the initial DCPD], the yield R (%)=(weight of the DCPOE formed/weight of the initial DCPD) x 100, and the selectivity for DCPOE: S (%)=R/C×100, as a function of the number of tests.

The conversion, the yield and the selectivity are determined by gaseous-phase chromatographic analysis of the crude reaction product after filtration.

EXAMPLE CONFORMING TO THE INVENTION 6.46 moles (853 g) of DCPD are run into the reservoir 14, and 5.86% by weight/DCPD of resin, i.e. the resin used in the previous example, namely 5.86% by weight relative to the DCPD, are introduced into the cartridge. The ethyleneglycol (11 moles or 682 g) is introduced into the tank 1. The cartridge has a volume of 230 ml and a height of 0.18 m. the circulation flow rate is 20 liters/hr, the dwell time in the cartridge is 25 sec with a linear flow velocity of 0.45 m/min.

The other operating conditions (heating, duration of the DCPD addition, heating time after the addition of DCPD) are the same as those applied in the comparative example. This example conforming to the invention is carried out without any filtration stage.

FIG. 3 illustrates the results obtained, with curves IV, V and VI showing the conversion, the yield and the selectivity for DCPOE respectively.

The figures show that the conversion of DCPD and the DCPOE yield and selectivity are better in the process conforming to this invention than in the classical process, as summarized in the table below, and despite the fact that the process conforming to the invention dispenses with the filtration operation.

TABLE

|  | DCPD | DCPOE | |
| --- | --- | --- | --- |
|  | C (%) | R (%) | S (%) |
| In batches (discontinuous) | 92.7 | 69 | 74.5 |
| Conforming to the invention | 94.6 | 72.8 | 76.9 |

The above table summarizes the results obtained in the 15th test.

We claim:

1. Process for the preparation of dicyclopentenyloxyethanol, having the formula

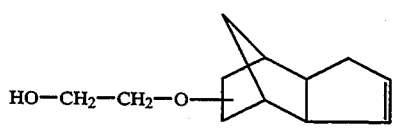

by reaction between dicyclopentadiene and ethylene glycol in the presence of a catalyst consisting essentially of an acid cation exchange resin, comprising mixing the dicyclopentadiene with the ethyleneglycol in a mixing tank to obtain a mixture and then bringing the mixture into contact with the catalyst in a cartridge separate from the mixing tank.

2. The process of claim 1, wherein the catalyst consists essentially of a macroporous resin having acid sulfonyl groups, with a particle size fraction between 0.315 and 1.25 mm representing at least 90% of its weight and a density between 700 and 800 g/liter.

3. The process of claim 1, which comprises carrying out the reaction in an installation comprising the tank for mixing the reactants, namely dicyclopentadiene and ethyleneglycol, the cartridge of catalyst positioned outside the tank and communicating with it in closed circuit, and means of circulating the liquid reactants and the liquid dicyclopentenyloxyethanol produced around the circuit, the said means being located downstream from the tank and upstream from the cartridge, a source of reactants communicating with the circuit via a feed pipe fitted with a stopcock and leading into the circuit at a point downstream from the tank and upstream from the cartridge, a stopcock being fitted in the circuit between the tank and a point where the feed pipe leads into the circuit.

4. The process of claim 3, wherein a three-way valve is fitted between the point where the feed pipe leads into the circuit and the cartridge.

5. The process of claim 4, wherein the three-way valve is fitted upstream from the means of circulation.

6. The process of claim 5, wherein a source of protective gas communicates with the tank.

7. The process of claim 4, wherein the tank is fitted with a cooling jacket.

8. The process of claim 4, wherein two branches of the circuit communicating with the tank both connect with it at the bottom.

* * * * *